(12) United States Patent
Tu et al.

(10) Patent No.: US 11,041,774 B2
(45) Date of Patent: Jun. 22, 2021

(54) PRESSURE SENSOR PACKAGE

(71) Applicant: LINGSEN PRECISION INDUSTRIES, LTD., Taichung (TW)

(72) Inventors: Ming-Te Tu, Taichung (TW); Chiung-Yueh Tien, Taichung (TW); Cheng-Yao Chang, Taichung (TW); Mei-Yen Su, Taichung (TW)

(73) Assignee: LINGSEN PRECISION INDUSTRIES, LTD., Taichung (TW)

( * ) Notice: Subject to any disclaimer, the term of this patent is extended or adjusted under 35 U.S.C. 154(b) by 418 days.

(21) Appl. No.: 15/923,574

(22) Filed: Mar. 16, 2018

(65) Prior Publication Data
US 2019/0265118 A1    Aug. 29, 2019

(30) Foreign Application Priority Data

Feb. 27, 2018  (TW) .................................. 107106587

(51) Int. Cl.
*G01L 19/14* (2006.01)
*G01L 19/00* (2006.01)

(52) U.S. Cl.
CPC ........ *G01L 19/143* (2013.01); *G01L 19/0076* (2013.01); *G01L 19/147* (2013.01)

(58) Field of Classification Search
CPC ......................... G01L 19/143; G01L 19/0076
See application file for complete search history.

(56) References Cited

U.S. PATENT DOCUMENTS

| | | | |
|---|---|---|---|
| 2008/0128840 A1* | 6/2008 | Benzel | G01L 19/0038 257/415 |
| 2009/0026558 A1* | 1/2009 | Bauer | H01L 24/83 257/414 |
| 2012/0106085 A1* | 5/2012 | Yamazaki | G01J 5/029 361/705 |
| 2013/0307094 A1* | 11/2013 | Yoshiuchi | G01C 19/5783 257/415 |
| 2016/0027992 A1* | 1/2016 | Lo | H01L 41/042 257/417 |
| 2017/0292884 A1* | 10/2017 | Ching, Jr. | G01L 9/0042 |

* cited by examiner

*Primary Examiner* — Clayton E. LaBalle
*Assistant Examiner* — Dennis Hancock
(74) *Attorney, Agent, or Firm* — Muncy, Geissler, Olds & Lowe, P.C.

(57) ABSTRACT

A pressure sensor package includes a package lead frame including a molding plastic layer with a top surface and a plurality of lead frame units mounted in the molding plastic layer, a sidewall disposed on the top surface of the molding plastic layer and surrounding a receiving chamber, a pressure sensor module mounted on the top surface of the molding plastic layer and disposed in the receiving chamber, and a packaging silicone mounted in the receiving chamber to encapsulate the pressure sensor module.

7 Claims, 1 Drawing Sheet

PRESSURE SENSOR PACKAGE

BACKGROUND OF THE INVENTION

1. Field of the Invention

The present invention relates to semiconductor packaging technology and more particularly, to a pressure sensor package.

2. Description of the Related Art

In conventional pressure sensor package structures, a metal cover is bonded to a ceramic substrate, and a pressure sensing module is disposed in the metal cover and filled with a molding compound to complete the entire package. However, the production cost of the ceramic substrate and the metal cap is too high. Therefore, how to reduce the production cost of the pressure sensor package structure has become an important issue.

SUMMARY OF THE INVENTION

The present invention has been accomplished under the circumstances in view. It is the main object of the present invention to provide a pressure sensor package, which effectively reduces the manufacturing cost.

To achieve this and other objects of the present invention, a pressure sensor package comprises a package lead frame, a sidewall, a pressure sensor module and a packaging silicone. The package lead frame comprises a molding plastic layer defining a top surface, and a plurality of lead frame units mounted in the molding plastic layer. The sidewall is disposed on the top surface of the molding plastic layer, surrounding a receiving chamber. The pressure sensor module is mounted on the top surface of the molding plastic layer and disposed in the receiving chamber. The packaging silicone is mounted in the receiving chamber to encapsulate the pressure sensor module.

Preferably, the molding plastic layer further defines an opposite bottom surface; the lead frame units each comprise a top edge and an opposing bottom edge respectively exposed to the outside of the opposing top surface and bottom surface of the molding plastic layer.

Preferably, the sidewall is selectively made from a molding resin or a metal material.

Preferably, the pressure sensor module comprises a plurality of chip units stacked up on the top surface of the molding plastic layer.

Preferably, the pressure sensor module is electrically connected with the lead frame units by metal wires or through a flip-chip process.

Preferably, the molding plastic layer is made from epoxy resin.

Preferably, the lead frame units are made from a metal material.

Subject to the use of the package lead frame instead of the conventional ceramic substrate to mate with the sidewall made of a metal material or a molded resin material and the use of the packaging silicone as an encapsulant, the invention reduce the manufacturing cost of the pressure sensor package and further improve the overall economic efficiency.

Other advantages and features of the present invention will be fully understood by reference to the following specification in junction with the accompanying drawings, in which like reference signs denote like components of structure.

DETAILED DESCRIPTION OF THE INVENTION

Figure 1:
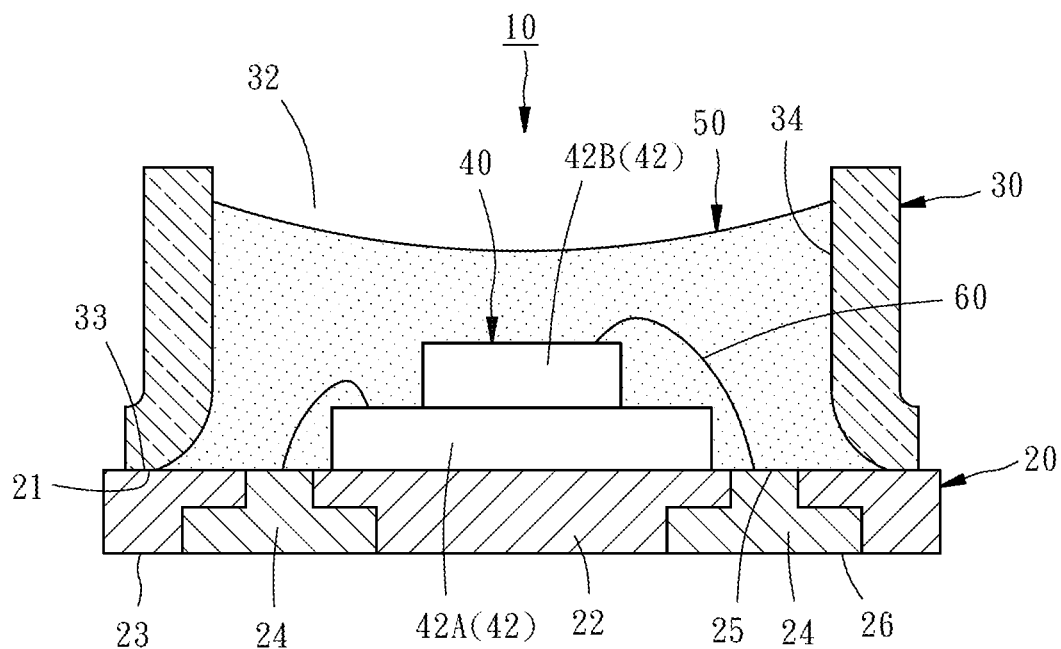
FIG. 1 is a sectional view of a pressure sensor package in accordance with a first embodiment of the present invention.

Referring to FIG. 1, a pressure sensor package 10 in accordance with the present invention is shown. The pressure sensor package 10 comprises a package lead frame 20, a sidewall 30, a pressure sensor module 40 and a packaging silicone 50.

The package lead frame 20 comprises a molding plastic layer 22 and a plurality of lead frame units 24. In the present preferred embodiment, the molding plastic layer 22 is made from epoxy resin. In other preferred embodiments, the molding plastic layer 22 can be selectively made from other insulating polymer packaging materials. The molding plastic layer 22 is a flat member defining a top surface 21 and an opposing bottom surface 23. The multiple lead frame units 24 are mounted in the molding plastic layer 22. The material of the lead frame units 24 may be selected from a metal material, such as gold, silver, copper, nickel, or alloy metal, such as a copper alloy or iron-nickel alloy. Each lead frame unit 24 defines a top edge 25 and an opposing bottom edge 26. The top edge 25 and bottom edge 26 of each lead frame unit 24 respectively exposed to the outside of the top surface 21 and bottom surface 23 of the molding plastic layer 22. It is to be noted that the multiple lead frame units 24 are electrically independent.

Figure 2:
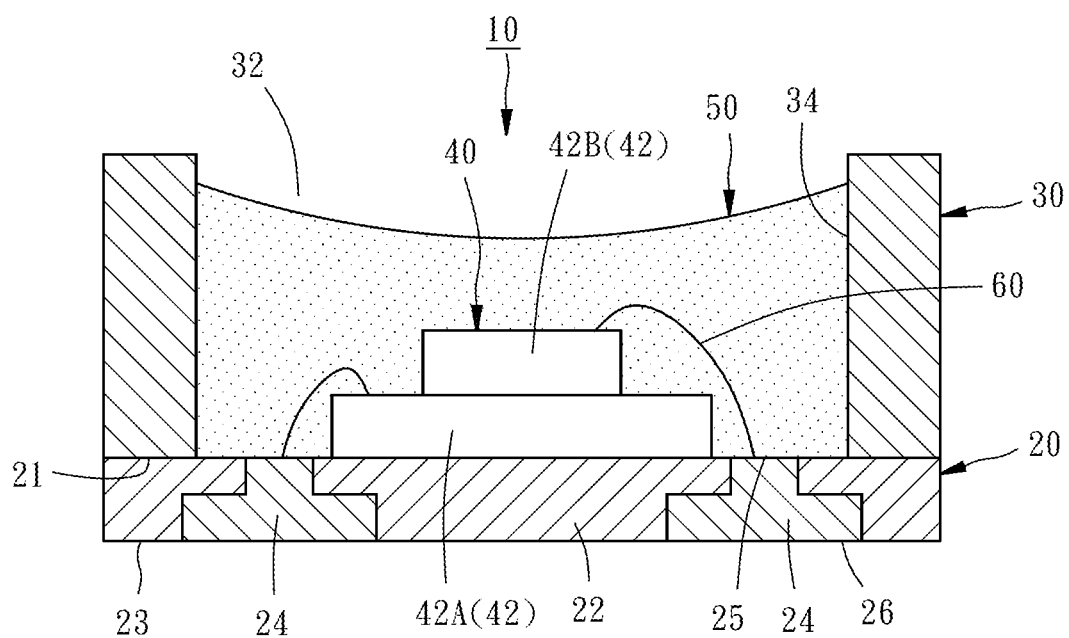
FIG. 2 is a sectional view of a pressure sensor package in accordance with a second embodiment of the present invention.

The sidewall 30 is disposed on the top surface 21 of the molding plastic layer 22 and surrounds a receiving chamber 32. The receiving chamber 32 is open upward. In the present preferred embodiment, the sidewall 30 is a metal wall with a bottom edge 33 thereof bonded to the top surface 21 of the molding plastic layer 22 by solder paste. In a second embodiment shown in FIG. 2, the sidewall 30 is formed of a molding resin directly bonded to the top surface 21 of the molding plastic layer 22 by a molding apparatus.

The pressure sensor module 40 is mounted on the top surface 21 of the molding plastic layer 22 and disposed in the receiving chamber 32. The pressure sensor module 40 can be electrically connected with each lead frame unit 24 with metal wires or by means of a flip-chip process. More specifically, the pressure sensor module 40 comprises a plurality of chip units 42 stacked up on the top surface 21 of the molding plastic layer 22. Each chip unit 42 is selected from a pressure sensor, an ASIC, an active component, a passive component, or a combination thereof. In the present preferred embodiment, the number of the chip units 42 is 2 respectively indicated by chip unit 42A and chip unit 42B. The chip unit 42A is mounted on the top surface 21 of the molding plastic layer 22 and electrically connected with each lead frame unit 24 by metal wires 60 or by means of flip-chip process. The chip unit 42B is stacked on a top surface of the chip unit 42A and electrically connected to the chip unit 42A or each lead frame unit 24 with metal wires, or electrically connected to the chip unit 42A by means of flip-chip process.

The packaging silicone 50 is filled in the receiving chamber 32 to encapsulate the pressure sensor module 40. The packaging silicone 50 is bonded to an inner wall surface 34 of the sidewall 30 and the top surface 21 of the molding plastic layer 22 to enhance the bond strength between the sidewall 30, the pressure sensor module 40 and the package lead frame 20.

In summary, subject to the use of the package lead frame 20 instead of the conventional ceramic substrate to mate with the sidewall 30 made of a metal material or a molding resin material and the use of the packaging silicone 50 as the encapsulant, the invention reduces the manufacturing cost of the pressure sensor package 10 and further improve the overall economic efficiency.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pressure sensor package, comprising:
   a package lead frame comprising a molding plastic layer defining a top surface and a plurality of lead frame units mounted in said molding plastic layer;
   a sidewall disposed on said top surface of said molding plastic layer and surrounding a receiving chamber and an opening;
   a pressure sensor module mounted directly on said top surface of said molding plastic layer and disposed in said receiving chamber; and
   a packaging silicone mounted in said receiving chamber to encapsulate said pressure sensor module, and said packaging silicone being exposed to said opening of said sidewall.

2. The pressure sensor package as claimed in claim 1, wherein said molding plastic layer further defines an opposite bottom surface; said lead frame units each comprising a top edge and an opposing bottom edge respectively exposed to an outside of the opposing said top surface and said bottom surface of said molding plastic layer.

3. The pressure sensor package as claimed in claim 1, wherein said sidewall is selectively made from a molding resin or a metal material.

4. The pressure sensor package as claimed in claim 1, wherein said pressure sensor module comprises a plurality of chip units stacked up on said top surface of said molding plastic layer.

5. The pressure sensor package as claimed in claim 1, wherein said pressure sensor module is electrically connected with said lead frame units by metal wires.

6. The pressure sensor package as claimed in claim 1, wherein said molding plastic layer is made from epoxy resin.

7. The pressure sensor package as claimed in claim 1, wherein said lead frame units are made from a metal material.

* * * * *